(12) United States Patent
Jose

(10) Patent No.: US 9,845,915 B2
(45) Date of Patent: Dec. 19, 2017

(54) COLLAPSIBLE STAND ATTACHED TO A BAGGAGE ITEM AND A METHOD FOR ITS USE

(71) Applicant: Boban Jose, San Ramon, CA (US)

(72) Inventor: Boban Jose, San Ramon, CA (US)

(*) Notice: Subject to any disclaimer, the term of this patent is extended or adjusted under 35 U.S.C. 154(b) by 0 days.

(21) Appl. No.: 15/255,203

(22) Filed: Sep. 2, 2016

(65) Prior Publication Data

US 2017/0055698 A1    Mar. 2, 2017

Related U.S. Application Data

(60) Provisional application No. 62/213,580, filed on Sep. 2, 2015.

(51) Int. Cl.
| | |
|---|---|
| *F16M 13/00* | (2006.01) |
| *F16M 13/02* | (2006.01) |
| *A45F 3/04* | (2006.01) |
| *A45C 15/00* | (2006.01) |
| *F16B 7/10* | (2006.01) |
| *A45F 3/00* | (2006.01) |

(52) U.S. Cl.
CPC ........... *F16M 13/022* (2013.01); *A45C 15/00* (2013.01); *A45F 3/04* (2013.01); *F16B 7/105* (2013.01); *A45F 2003/003* (2013.01)

(58) Field of Classification Search
CPC ....... A47B 23/06; A47B 23/002; A45C 15/00; A45F 3/04; A45F 2003/003; F16B 7/10
See application file for complete search history.

(56) References Cited

U.S. PATENT DOCUMENTS

| | | | |
|---|---|---|---|
| 853,566 | A | 5/1907 | Sparks |
| 2,416,783 | A | 3/1947 | Vallieres |
| 2,517,178 | A | 8/1950 | Cheatham |
| 2,538,616 | A | 1/1951 | Cross |
| 2,718,943 | A | 9/1955 | Braverman |
| 3,606,372 | A | 9/1971 | Browning |
| 3,814,220 | A | 6/1974 | Brody |
| 4,146,045 | A | 3/1979 | Grant |
| 4,160,496 | A | 7/1979 | Knight |
| 4,538,709 | A | 9/1985 | Williams et al. |
| 4,588,056 | A | 5/1986 | Bernbaum |

(Continued)

FOREIGN PATENT DOCUMENTS

| | | |
|---|---|---|
| DE | 202009010549 U1 | 10/2009 |
| WO | 0152687 A | 7/2001 |

(Continued)

OTHER PUBLICATIONS

Search Report and Written Opinion dated May 13, 2016 from International U.S. Appl. No. PCT/US2016/017464 filed Feb. 11, 2016.

(Continued)

*Primary Examiner* — Daniel J Rohrhoff
(74) *Attorney, Agent, or Firm* — Law Office of Ilya Libenzon

(57) ABSTRACT

A stand attached to a baggage item includes a collapsible shaft having a proximal end attached to the baggage item and a distal end. In some embodiments, the stand includes a support on to which an object may be secured. In some embodiments, the stand includes one or more basal elements.

17 Claims, 18 Drawing Sheets

(56) References Cited

U.S. PATENT DOCUMENTS

| | | | |
|---|---|---|---|
| 4,795,186 A | 1/1989 | Tyus | |
| 5,265,307 A | 11/1993 | Hull et al. | |
| 5,375,685 A | 12/1994 | Plath | |
| 5,433,303 A | 7/1995 | Chen | |
| 5,464,080 A | 11/1995 | Liang | |
| 5,564,538 A | 10/1996 | Sadow | |
| 5,699,886 A | 12/1997 | Latshaw | |
| 5,806,143 A | 9/1998 | Tsai | |
| 5,904,230 A | 5/1999 | Peterson | |
| 5,924,533 A | 7/1999 | Cnockaert et al. | |
| 6,024,264 A * | 2/2000 | Java | A45B 3/00 135/16 |
| 6,105,508 A | 8/2000 | Ryburg | |
| 6,213,265 B1 | 4/2001 | Wang | |
| 6,279,706 B1 * | 8/2001 | Mao | A45C 5/14 16/113.1 |
| 6,540,134 B1 | 4/2003 | Rasche | |
| 6,543,796 B1 | 4/2003 | Johnson et al. | |
| 6,564,426 B1 * | 5/2003 | Wang | A45C 13/262 16/113.1 |
| 6,776,300 B2 | 8/2004 | Walsh et al. | |
| 6,898,823 B2 | 5/2005 | Tsai | |
| 7,328,796 B2 | 2/2008 | Brunson et al. | |
| 7,445,216 B1 | 11/2008 | Chou | |
| 7,451,861 B2 | 11/2008 | Bhavnani | |
| 7,617,956 B1 * | 11/2009 | Sabbah | A45C 5/143 190/18 A |
| 7,832,532 B2 | 11/2010 | Nykoluk et al. | |
| 7,845,508 B2 | 12/2010 | Rothschild et al. | |
| 7,987,955 B2 | 8/2011 | Puchalski | |
| 8,317,558 B2 | 11/2012 | Bucknell et al. | |
| 8,613,349 B1 | 12/2013 | Halko et al. | |
| 8,662,267 B1 | 3/2014 | Hart et al. | |
| 8,869,960 B2 | 10/2014 | Mangano | |
| 9,277,796 B1 | 3/2016 | Elam | |
| 2002/0056736 A1 | 5/2002 | Conte | |
| 2002/0084159 A1 | 7/2002 | Hamlin | |
| 2002/0096410 A1 * | 7/2002 | Nykoluk | A45C 5/14 190/115 |
| 2004/0108345 A1 * | 6/2004 | Oh | A45C 5/14 224/153 |
| 2004/0181906 A1 | 9/2004 | Kuo et al. | |
| 2004/0238304 A1 | 12/2004 | Fisher | |
| 2005/0011043 A1 | 1/2005 | Comstock | |
| 2005/0016809 A1 | 1/2005 | Wu | |
| 2005/0082131 A1 | 4/2005 | Fenton et al. | |
| 2005/0098402 A1 | 5/2005 | Cohen | |
| 2005/0183914 A1 | 8/2005 | Lin | |
| 2006/0037825 A1 | 2/2006 | Dayton et al. | |
| 2006/0076203 A1 | 4/2006 | Miller | |
| 2006/0118376 A1 * | 6/2006 | Godshaw | A01K 1/0254 190/107 |
| 2006/0272126 A1 | 12/2006 | Burgess et al. | |
| 2007/0007801 A1 | 1/2007 | Bishop | |
| 2007/0012593 A1 | 1/2007 | Kitchens et al. | |
| 2007/0089952 A1 | 4/2007 | Herbst et al. | |
| 2007/0164064 A1 * | 7/2007 | Nathan | A45C 5/14 224/153 |
| 2008/0078790 A1 * | 4/2008 | Bolling | A45B 11/00 224/190 |
| 2010/0051633 A1 | 3/2010 | Porte et al. | |
| 2010/0089778 A1 | 4/2010 | Park | |
| 2010/0282556 A1 | 11/2010 | Tseng et al. | |
| 2010/0313383 A1 | 12/2010 | Lai | |
| 2011/0209960 A1 | 9/2011 | MacLean et al. | |
| 2012/0217109 A1 | 8/2012 | King et al. | |
| 2012/0273314 A1 | 11/2012 | Raymond et al. | |
| 2012/0325607 A1 | 12/2012 | Webster et al. | |
| 2013/0032443 A1 | 2/2013 | Soedomo | |
| 2013/0075213 A1 | 3/2013 | Chen et al. | |
| 2013/0075214 A1 | 3/2013 | Chen et al. | |
| 2013/0098410 A1 * | 4/2013 | Prasannakumar | A45B 11/00 135/16 |
| 2013/0153351 A1 | 6/2013 | House | |
| 2013/0175130 A1 | 7/2013 | Liang | |
| 2013/0233362 A1 * | 9/2013 | Miller-Klerer | A45B 23/00 135/16 |
| 2013/0264160 A1 | 10/2013 | Mediamolle | |
| 2014/0151172 A1 | 6/2014 | Diaz | |
| 2014/0238799 A1 | 8/2014 | Sharma | |
| 2014/0299428 A1 * | 10/2014 | Gadbois | A45C 9/00 190/11 |
| 2015/0047939 A1 * | 2/2015 | Chang | A45C 13/28 190/102 |
| 2015/0272291 A1 | 10/2015 | Sener et al. | |
| 2015/0348347 A1 | 12/2015 | Diz et al. | |
| 2016/0113388 A1 * | 4/2016 | Distefano | A47B 5/04 108/41 |

FOREIGN PATENT DOCUMENTS

| | | |
|---|---|---|
| WO | 2009027992 A2 | 3/2009 |
| WO | 2009039154 A1 | 3/2009 |

OTHER PUBLICATIONS

Search Report and Written Opinion dated May 13, 2016 from International Serial No. PCT/US2016/017470 filed Feb. 11, 2016.
Search Report and Written Opinion dated May 13, 2016 from International Serial No. PCT/US2016/017475 filed Feb. 11, 2016.
Search Report and Written Opinion dated May 19, 2016 from International Serial No. PCT/US2016/017447 filed Feb. 11, 2016.
Search Report and Written Opinion dated Aug. 31, 2016 from International Serial No. PCT/US2016/036485 filed Jun. 8, 2016.
Search Report and Written Opinion dated Aug. 31, 2016 from International Serial No. PCT/US2016/036494 filed Jun. 8, 2016.

* cited by examiner

COLLAPSIBLE STAND ATTACHED TO A BAGGAGE ITEM AND A METHOD FOR ITS USE

TECHNICAL FIELD

This invention relates to accessories to luggage. More particularly, the present invention relates to a collapsible stand attached to a luggage item.

BACKGROUND ART

A common issue when traveling is a need for a temporary support for belongings. A passenger waiting for an airplane, for instance, might wish to sit and read, or work on a mobile device, but may quickly tire of holding a book or laptop, or may find it necessary to free his or her hands for another task. People may be observed using their carry-on baggage as impromptu desks, or setting objects on seats beside them, forcing them into awkward positions to use the items. Another frequent need is for a camera tripod or similar device that can be used to steady shots or take group pictures; a handheld tripod is an irksome encumbrance, and a tripod stowed in a bag is difficult to access.

In view of the above, there is a need for a multipurpose support that is compact, readily available, and out of the way when not in use.

SUMMARY

In one aspect, a stand attached to a baggage item includes a collapsible shaft having a proximal end attached to the baggage item and a distal end. The stand includes a support attached to the distal end.

In a related embodiment, the shaft includes a plurality of telescoping stages. In another embodiment, one stage of the plurality of telescoping stages is attached to the baggage item. In an additional embodiment, the stage attached to the baggage item is incorporated in the baggage item. A further embodiment includes a latch that detachably attaches the proximal end of the shaft to the baggage item. In still another embodiment, the shaft has two or more stages that can pivot relative to each other to collapse the shaft. In yet another embodiment, the baggage item further includes a chamber that admits the stand when the shaft is folded. In an additional embodiment, the shaft further includes a plurality of mutually movable sections, and the stand also includes at least one latch that engages to fix a first section of the plurality of mutually movable sections with respect to a second section of the plurality of mutually movable sections.

In another related embodiment, the support is pivotally attached to the distal end of the shaft. In a further embodiment, the support also includes a device to secure an object to the support. In a further embodiment still, the device includes at least one strap. In yet another embodiment, the device includes at least one fastener. In an additional embodiment, the support includes a work surface.

Another related embodiment includes at least one basal element attached to the shaft. In one embodiment, the at least one basal element includes at least one frame element incorporated in the baggage item. In another embodiment, the at least one basal element also includes a brace that extends outward to contact a surface on which the stand and baggage item are resting. In a further embodiment, the brace is attached to the shaft. In an additional embodiment, the brace is attached to the baggage item. In still another embodiment, the brace is movable between an extended position in which it is contacting the surface and a stowed position in which it is not contacting the surface. In yet another embodiment, the brace further includes at least one collapsible leg. A further embodiment includes a chamber in which the brace is stowed when not in use.

These and other features of the disclosed device will be presented in more detail in the following detailed description of the device and the associated figures.

BRIEF DESCRIPTION OF THE DRAWINGS

The preceding summary, as well as the following detailed description of the disclosed system and method, will be better understood when read in conjunction with the attached drawings. For the purpose of illustrating the system and method, presently preferred embodiments are shown in the drawings. It should be understood, however, that neither the system nor the method is limited to the precise arrangements and instrumentalities shown.

DETAILED DESCRIPTION OF SPECIFIC EMBODIMENTS

Embodiments of the disclosed stand enable travelers to use their backpacks as tripods or bookstands. In some embodiments, a collapsible shaft allows the stand to be deployed at a moment's notice to support a camera, tablet, book, or other device, freeing up the traveler's hands and allowing for steady camera shots and easy group pictures. The collapsible shaft may also be stowed rapidly to allow easy use of a backpack or other baggage item as needed. Some embodiments allow a user to mount a camera, or a device incorporating a camera, on the stand while it is attached to a backpack or similar baggage item the user is wearing, permitting the user to film or photograph while moving about with the baggage item.

Figure 1A:
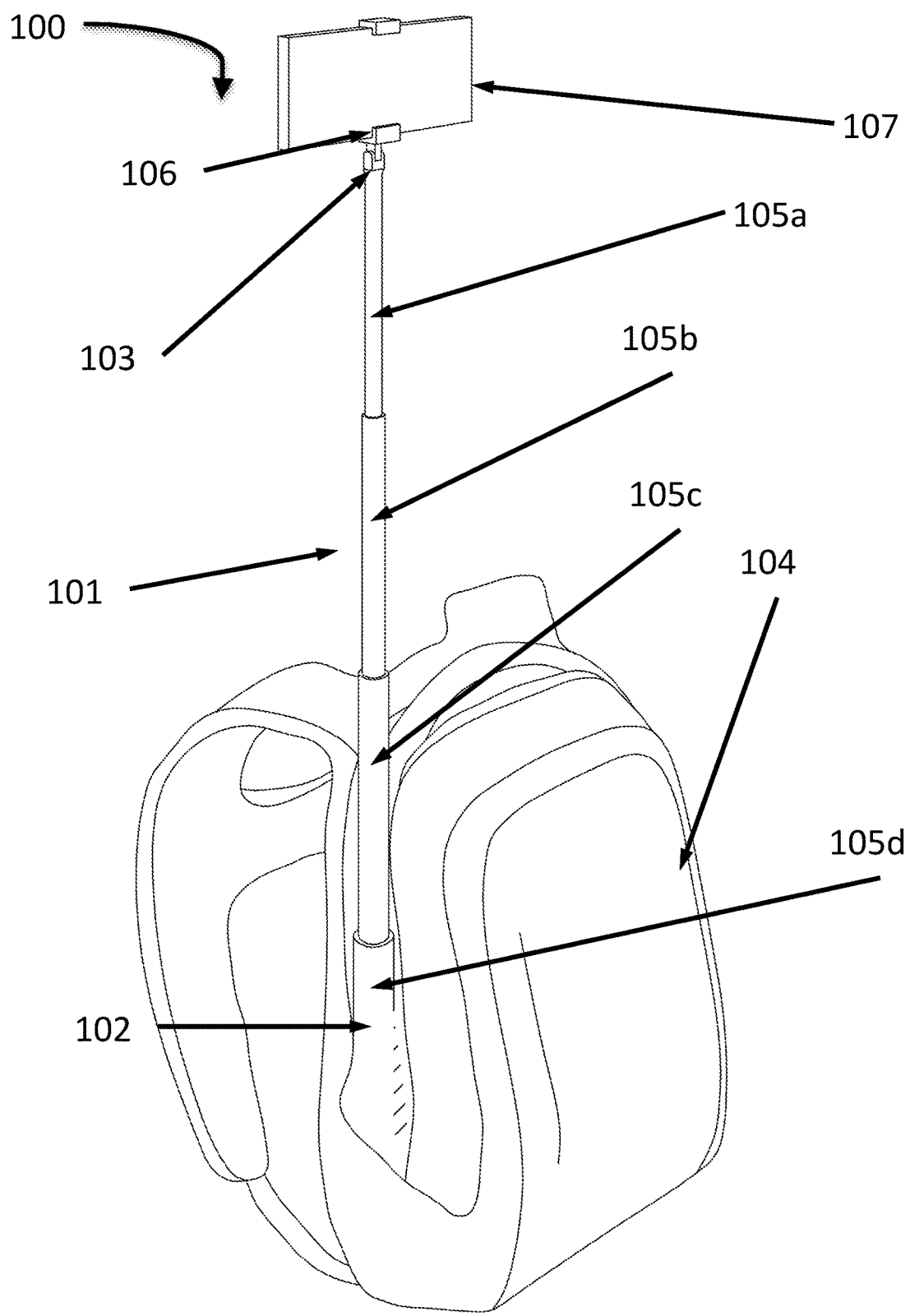
FIG. 1A is a schematic diagram of an embodiment of the disclosed stand.
Figure 1B:
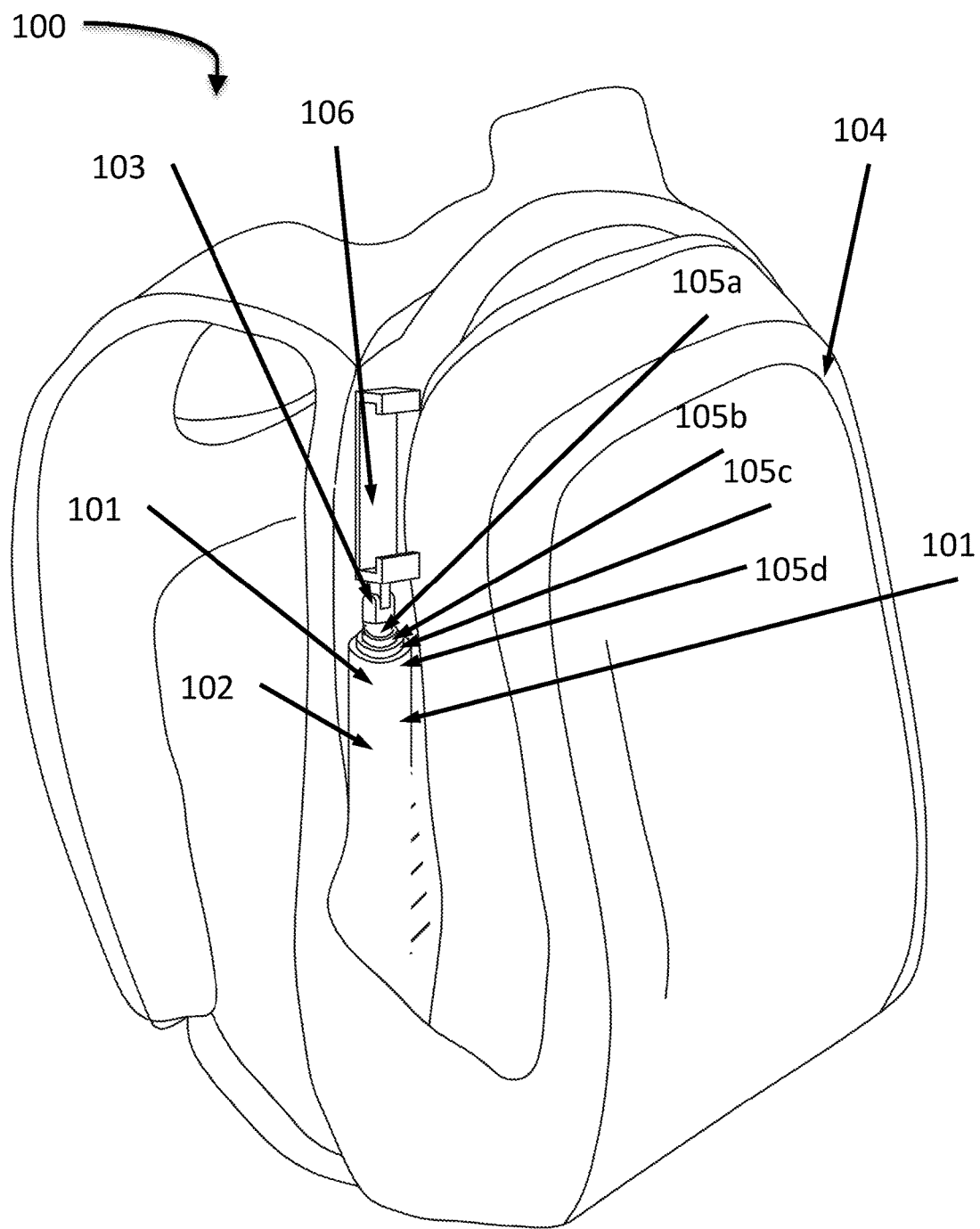
FIG. 1B is a schematic diagram of an embodiment of the disclosed stand.

FIGS. 1A-B illustrate an embodiment of a stand attached 100 attached to a baggage item. As an overview, the stand 100 includes a collapsible shaft 101. The collapsible shaft 101 has a proximal end 102 and a distal end 103. The proximal end 102 is attached to a baggage item 104.

Referring to FIG. 1A-1B in further detail, the shaft 101 may be constructed from any material or combination of materials that render the shaft 101 rigid and strong enough not to flex or break when used to support an object placed on the stand 100. The materials making up the shaft 101 may include metal. The materials making up the shaft 101 may include synthetic polymers, such as plastic. The materials making up the shaft 101 may include natural polymers. The materials making up the shaft 101 may include wood. The shaft 101 may be solid or hollow; for instance, the shaft 101 may be a tube. Where the shaft 101 is hollow, the interior space of the shaft 101 may be formed to accommodate an actuator (not shown) that can activate a latch, such as the latch described in further detail below. The shaft 101 may have any cross-sectional shape or combination of shapes, including polygons, circles, ellipses, and combined polygonal and curved shape; the cross-sectional shape may vary over the length of the shaft 101.

Figure 1C:
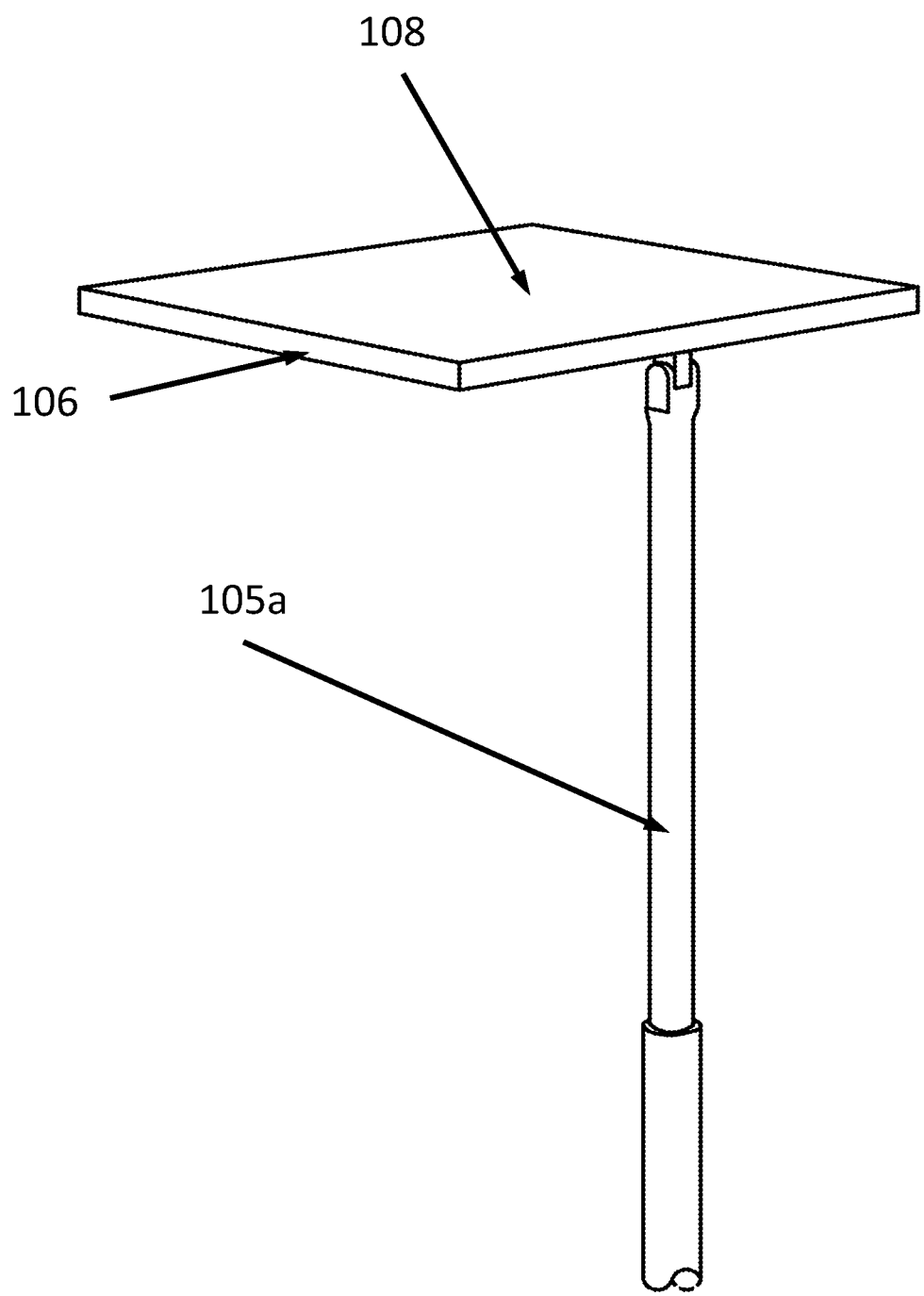
FIG. 1C is a schematic diagram of an embodiment of a support.
Figure 1D:
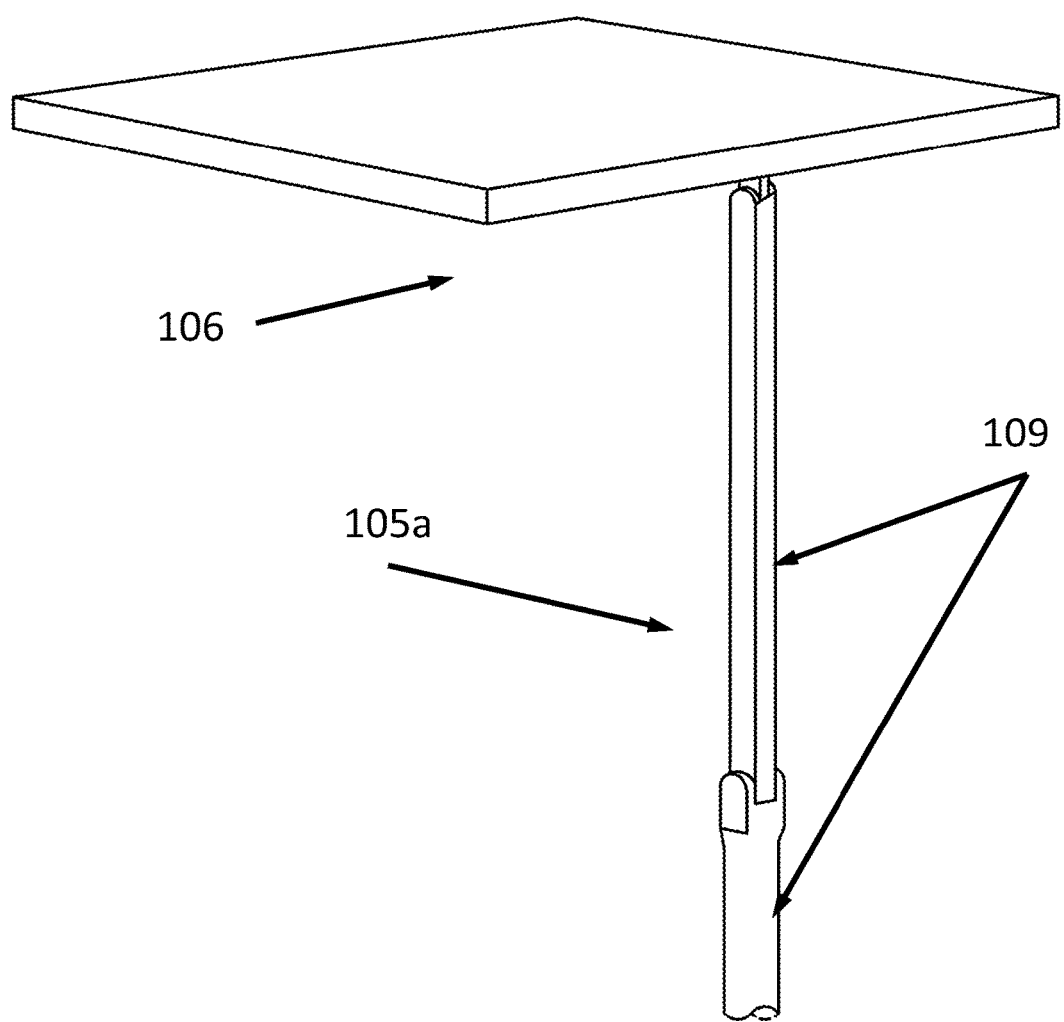
FIG. 1D is a schematic diagram of a shaft.

The shaft 101 is collapsible. In some embodiments, the shaft is collapsible if it is capable of being converted from a first, or extended, position in which the distal end 103 is a first distance from the baggage item 104 to a second or collapsed position in which the distal end 103 is a second distance from the baggage item 104, the second distance shorter than the first distance. In some embodiments, the shaft 101 includes one or more mutually movable components. The one or more components may be able to slide or pivot with respect to one another. For instance, in some embodiments the shaft 101 includes a plurality of telescoping stages 105a-d, which may be retracted, as shown in FIG. 1B by sliding one or more stages 105a-c into an interior space within one or more other stages 105b-d; for instance, the top-most stage 105a may be slid into the second stage from the top 105b, which may in turn be slid into the third stage from the top 105c, and so forth. The shaft 101 may be made up of one or more sections that may be folded with respect to one another; for instance the sections 109 may be connected by one or more hinges, joints, or flexible cords, for instance as shown in FIG. 1D. The shaft 101 may be made up of one or more sections that may be detached from one another.

The shaft is incorporated in a baggage item 104. The baggage item 104 may be a receptacle used to transport articles during travel. For example, the baggage item 104 may be a backpack. The luggage item 104 may be a suitcase. The baggage item 104 may be a wheeled suitcase. The baggage item 104 may be an attaché case. The baggage item 104 may be a duffel bag. The baggage item 104 may be a bag, such as a canvas or laundry bag. The baggage item 104 may be a briefcase. The baggage item 104 may be an item of wheeled luggage. Any material or combination or materials used to make an item of luggage may be used to make the baggage item 104, including natural and synthetic textiles, any rigid materials such as metals, rigid polymers such as plastic, wood, ceramic, fiberglass, or other rigid composite materials, and any flexible or semi-flexible sheets of natural or synthetic polymers.

The proximal end 102 of the shaft 101 may be attached to the baggage item 104 by any suitable means. For instance, the proximal end 102 may be attached with one or more fasteners such as a screws, bolts, or rivets. The proximal end 102 may be stapled to the baggage item 104. The proximal end 102 may be sewn to the baggage item 104. The proximal end 102 may be fused to the baggage item 104. The baggage item 104 and the proximal end 102 may be manufactured together; for instance, part of the baggage item 104 may be molded together with a portion of the shaft 101 that includes the distal end 102. The distal end 102 may be attached to a frame element incorporated in the baggage item 104, as described below. In some embodiments, where the shaft is a telescoping shaft, one stage 105d of the telescoping shaft is incorporated in the baggage item 104; for instance, one stage 105d of the telescoping shaft may form a chamber within the baggage item 104 into which the other stages 105a-c may slide. In other embodiments, where the shaft a plurality of sections that may be folded relative to one another, the baggage item 104 includes a chamber that admits the shaft when the shaft is folded. The distal end 102 may be detachable from the baggage item 104, for instance as set forth in further detail below.

Figure 2A:
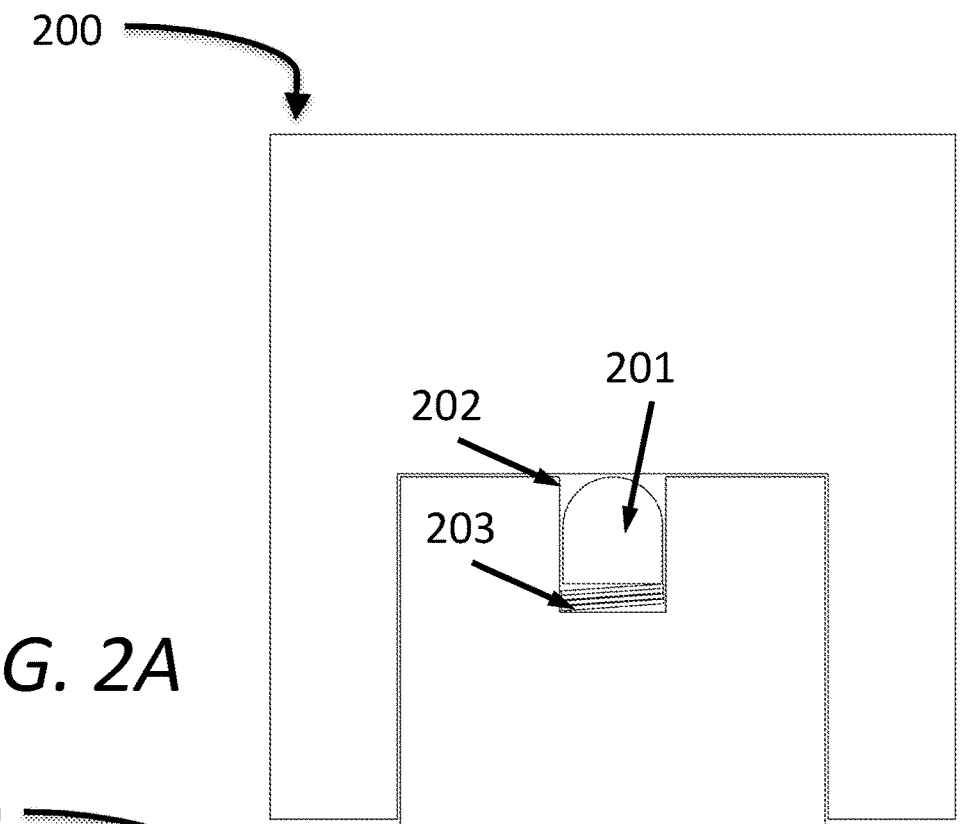
FIG. 2A is a schematic diagram of an embodiment of a latch used in the disclosed stand.
Figure 2B:
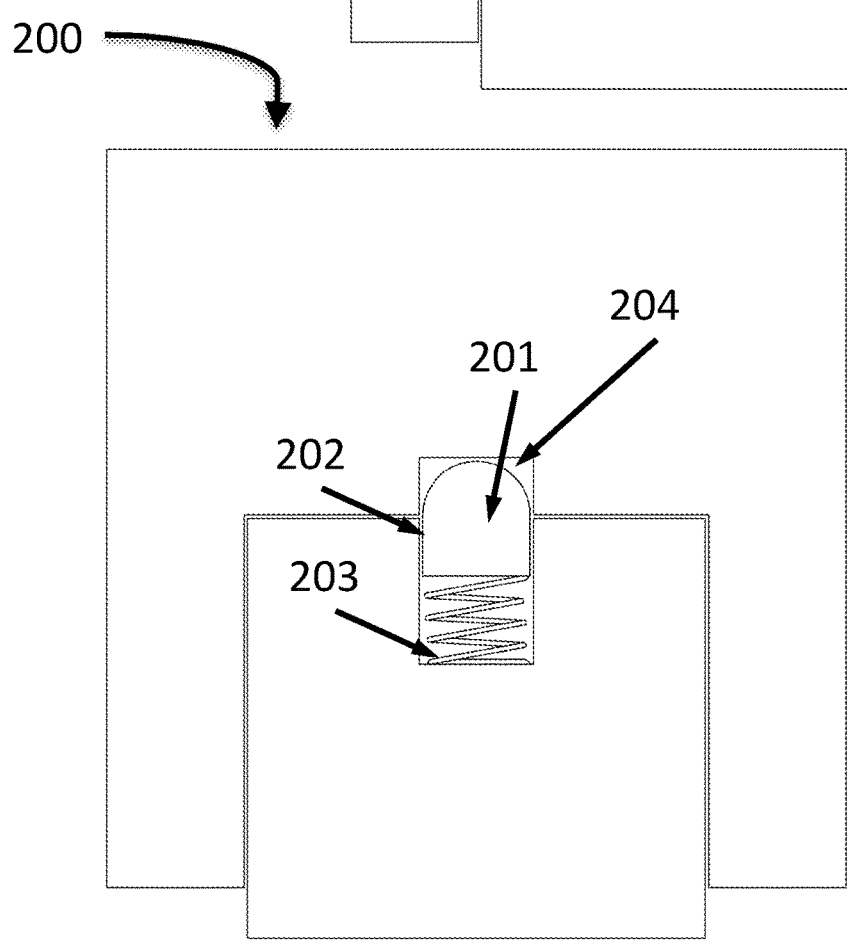
FIG. 2B is a schematic diagram of an embodiment of a latch used in the disclosed stand.

In some embodiments, where the shaft 101 includes a plurality of mutually movable sections, the stand 100 also includes at least one latch that engages to fix a first section of the plurality of mutually movable sections with respect to a second section of the plurality of mutually movable sections. For instance, as illustrated in FIGS. 2A-2B, in embodiments in which the shaft 101 may be collapsed by sliding one or more stages 105a-d with respect to one another, at least one engagement latch 200 may fix the shaft 101 in its extended position. As an example, the at least one engagement latch may include a first engagement latch that fixes the proximal end 102 of the shaft 101 relative to the baggage item 104 when the shaft 101 is in the extended position. The engagement latch 200 may include a pin 201 in a chamber 202 in the shaft 101, or in a surface past which the shaft 101 slides, which is urged out of its chamber 202 by a spring 203 or similar biasing means, so that when a corresponding chamber 204 in a structure 205 past which the first chamber 202 slides moves opposite the chamber 202, the pin 201 will enter the corresponding chamber 204. The pin 201 may be rounded at the end that enters the corresponding chamber 204, so that a user can push the pin 201 back into its chamber 202 against the bias of the biasing means 203 using the corresponding chamber 204, for instance by pushing the shaft 101 back into a retracted position. There may be several corresponding chambers 204, or alternatively, several pins 201 at various positions along the shaft 101 or along a surface past which the shaft 101 slides, so that the shaft 101 can be secured at various degrees of extension or retraction. The latch 200 may engage and disengage according to any other suitable mechanism. The at least one engagement latch 200 may similarly engage one component of the shaft 101 with another component of the shaft 101; for example, where the shaft 101 is made up of telescoping sections, the at least one engagement latch may fix two sections together so they are not mutually slidable until the engagement latch has been disengaged.

In other embodiments, the stages are slidably fixed with regard to each other by friction; for instance, one stage may fit snugly inside another stage so that the two stages exert static friction forces on each other. The static friction forces may be sufficient to prevent the shaft 101 from collapsing under the weight of an object placed on the support 106, while being insufficient to prevent a user from adjusting or collapsing the shaft manually. The shaft 101 may include at least one screw (not shown) having an axis of rotation substantially orthogonal to the direction of motion of the stages, which can be turned manually to exert pressure on one or more stages, increasing the friction between stages and helping to fix the stages in position relative to each other. The shaft 101 may be held in an extended position by any other suitable mechanism, including without limitation a one-way jigsaw mechanism.

Referring once again to FIGS. 1A-B, the stand 100 may include a support 106 attached to the distal end 103 of the shaft 101. As used herein, a support 106 is an element that supports a object on the stand securely enough that the object is unlikely to fall off of the support when the user places the object on the support, while permitting the user to use the object for its intended function; the support 106 may function as a small table or other supporting surface, or in a manner analogous to the portion of a tripod that engages a camera. As a non-limiting example, the object may be a mobile device such as a smartphone, and the support 106 may be a table or an element that grips the smartphone. In contrast, a hand-grip, such as those conventionally found on suitcase and luggage handles, would not be a support as used herein, because most objects placed on the hand-grip would be likely to fall off, unless jammed between elements of the hand-grip, rendering an object like a smartphone or book largely useless while in that position. In some embodiments, the support 106 is pivotally attached to the shaft. The pivotal attachment may permit the support 106 to pivot about one, two, or three axes. As a non-limiting example, the support 106 may have a substantially C-shaped form, as shown for instance in FIG. 1B. The support 106 may be a clamp. The support 106 may have a substantially table-like form, for instance as shown in FIG. 1C. In some embodiments, as shown for instance in FIG. 1C, the support 106 has a work surface 108 on which an item may be rested; the item placed on the work surface may be a camera. The item may be a device including a camera, such as a mobile phone or tablet. The item may be a book. The item may be a computing device, such as a laptop, netbook, tablet, or other mobile device. The work surface may have any suitable size or shape, including any regular or irregular polygon, or any surface bounded by curved or polygonal edge elements. The work surface may be constructed using any materials suitable for the construction of the baggage item 104 or the shaft 101. The work surface may be substantially flat. The work surface may include one or more features to prevent objects from sliding off of it, such as lip near an edge of the work surface.

In some embodiments, the support 106 includes a device 107 to secure an object to the support. The device 107 may include at least one strap. The strap may be constructed of any material or combination of materials suitable for making a strap, including textiles, polymers such as plastics or elastics, natural tissues such as leather, and metals. The device 107 may include at least one fastener; the at least one fastener may include a screw, buckle, clip, claim, hook-and-loop fastener, or other device suitable for securing an object to the support 106. The at least one fastener may secure the object placed on the support 106 directly, or may secure the at least one strap about the object.

Figure 1E:
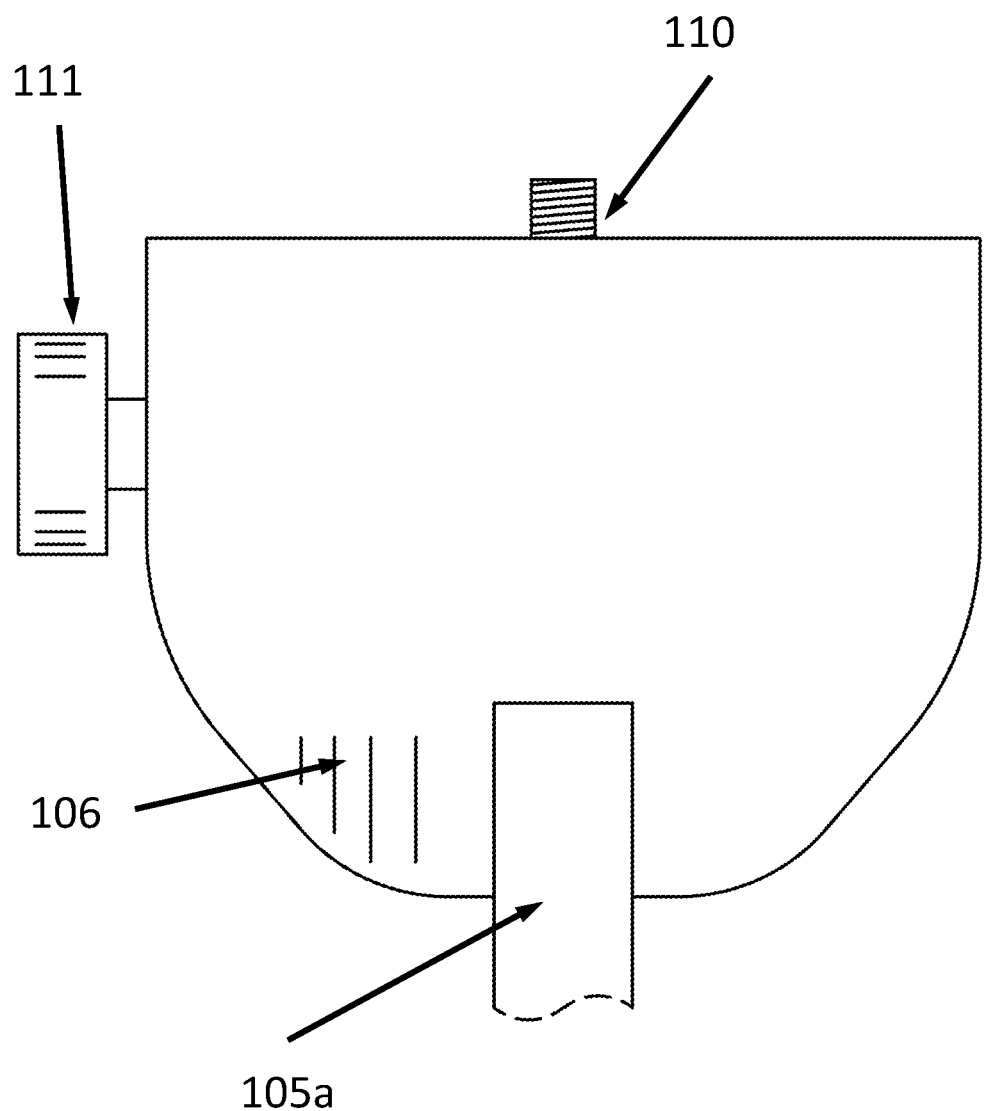
FIG. 1E is a schematic diagram of a support with a fastener.
Figure 1F:
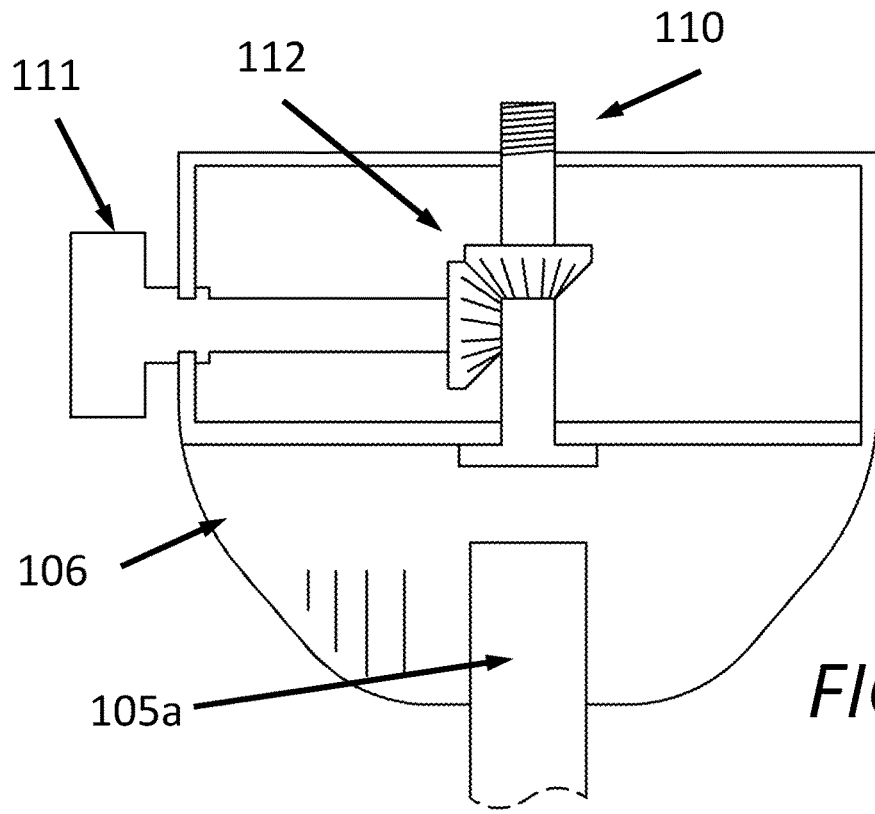
FIG. 1F is a schematic diagram of a support with a fastener.
Figure 1G:
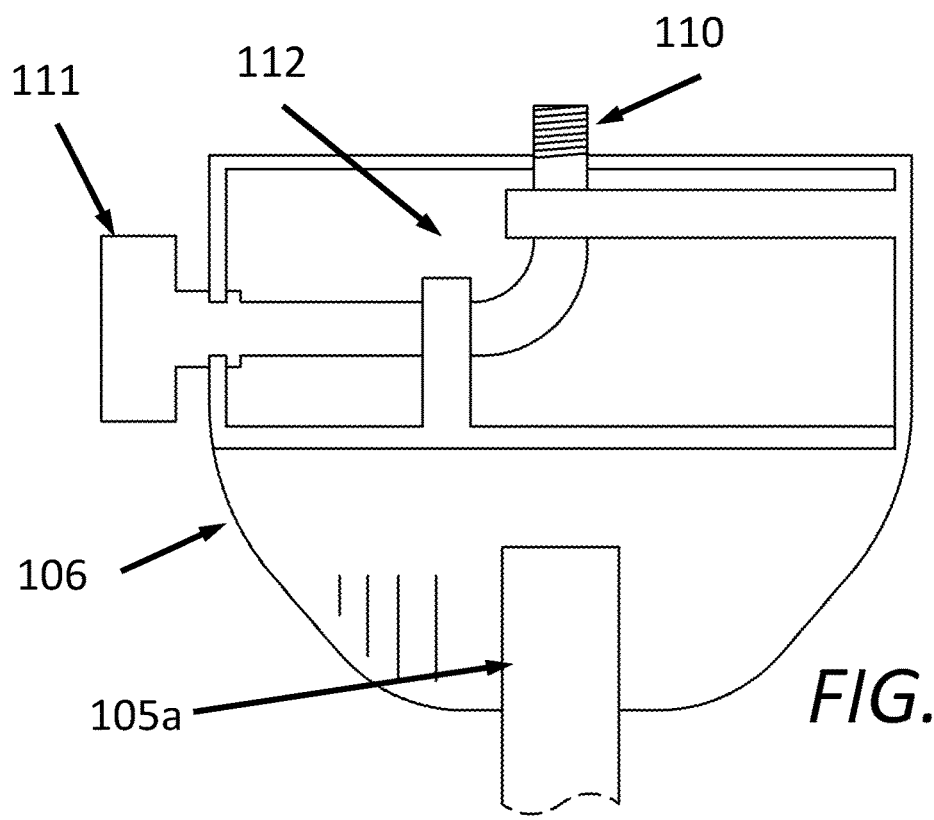
FIG. 1G is a schematic diagram of a support with a fastener.

In some embodiments, as shown for instance in FIGS. 1E-1G, the support 106 has a fastener 110 that can fasten to objects placed on the support; the objects may be a tray, C-shaped clamp, or any other support component described above. In other embodiments, the object is an external object such as a camera that can be directly fastened using the fastener 110. The fastener 110 may be any kind of fastener, including without limitation a screw. In some embodiments, the fastener 110 is a screw that may be manually rotated with respect to the support 106 to attach to an object that can receive the screw with reciprocal threading; a knob 111 accessible to be turned manually by the user may be coupled to the screw so that turning the knob 111 turns the screw 110 as well. The coupling 112 may be in the form of a set of gears, as shown in FIG. 1F, a flexible shaft, as shown in FIG. 1G, or any other suitable coupling for transferring rotational movement.

Figure 3A:
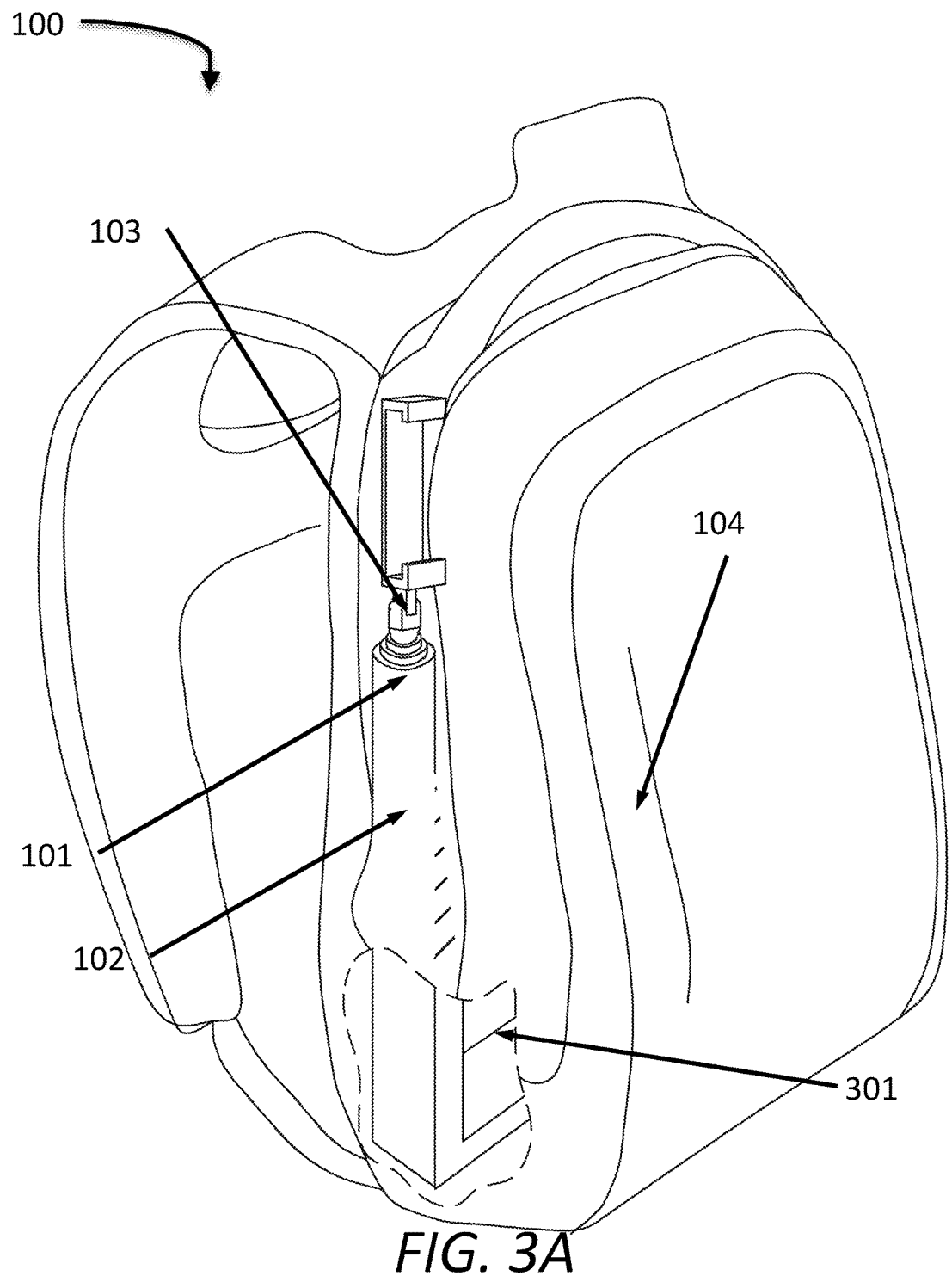
FIG. 3A is a schematic diagram of an embodiment of the stand including a frame element.

The stand 100 may be attached to one or more basal elements; the one or more basal elements may be elements that brace the stand 100 against a surface on which the baggage item 104 rests, to maintain the stability of the support 100. In some embodiments, as shown in FIG. 3A, the shaft 101 is connected to at least one frame element 301 incorporated in the baggage item 104. The at least one frame element 301 may be substantially rigid; the at least one frame element 301 may be constructed from any material or combination of materials suitable for the construction of the shaft 101. In some embodiments, the at least one frame element 301 has a component near the portion of the baggage item 104 that contacts the surface when the stand 100 is erected; for instance, the component may be inside the baggage item 104 but essentially resting on the floor with only the exterior covering of the baggage item 104 separating the at least one frame element 301 from the floor.

Figure 3B:
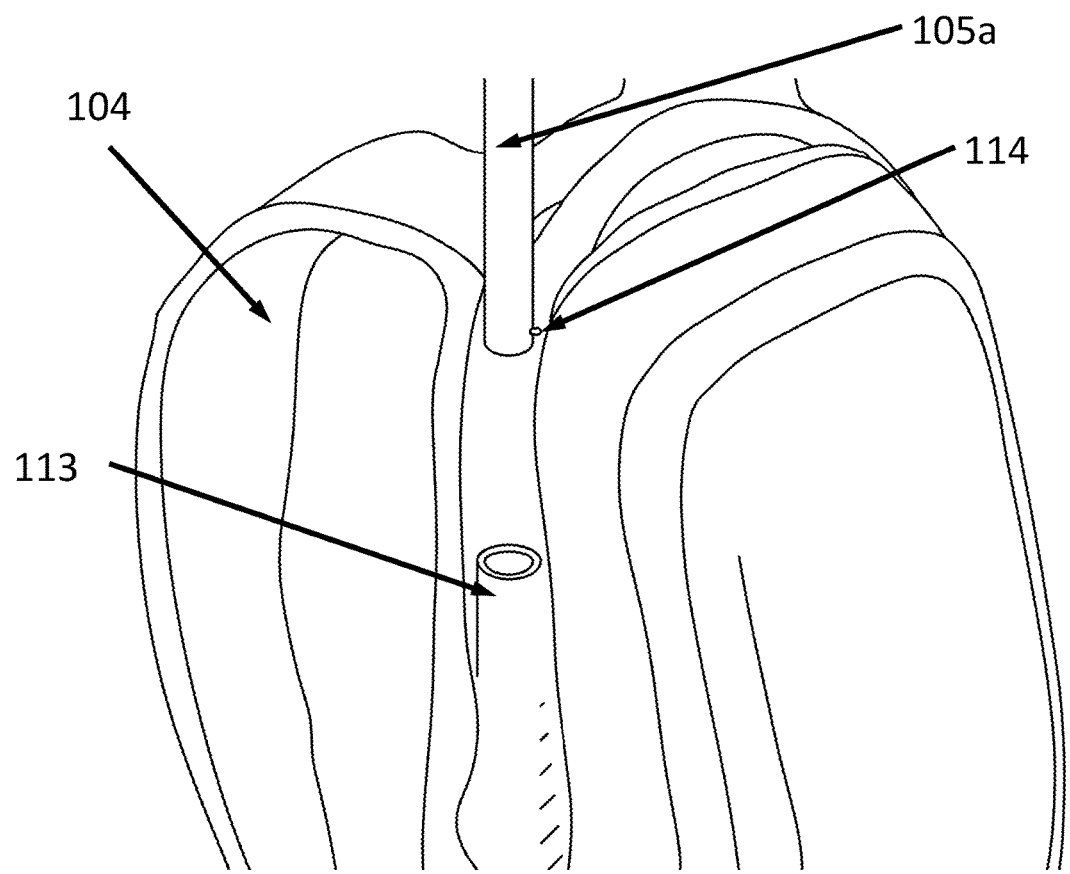
FIG. 3B is a schematic diagram of an embodiment of the stand including a latch for attaching the frame element to a baggage item.
Figure 3C:
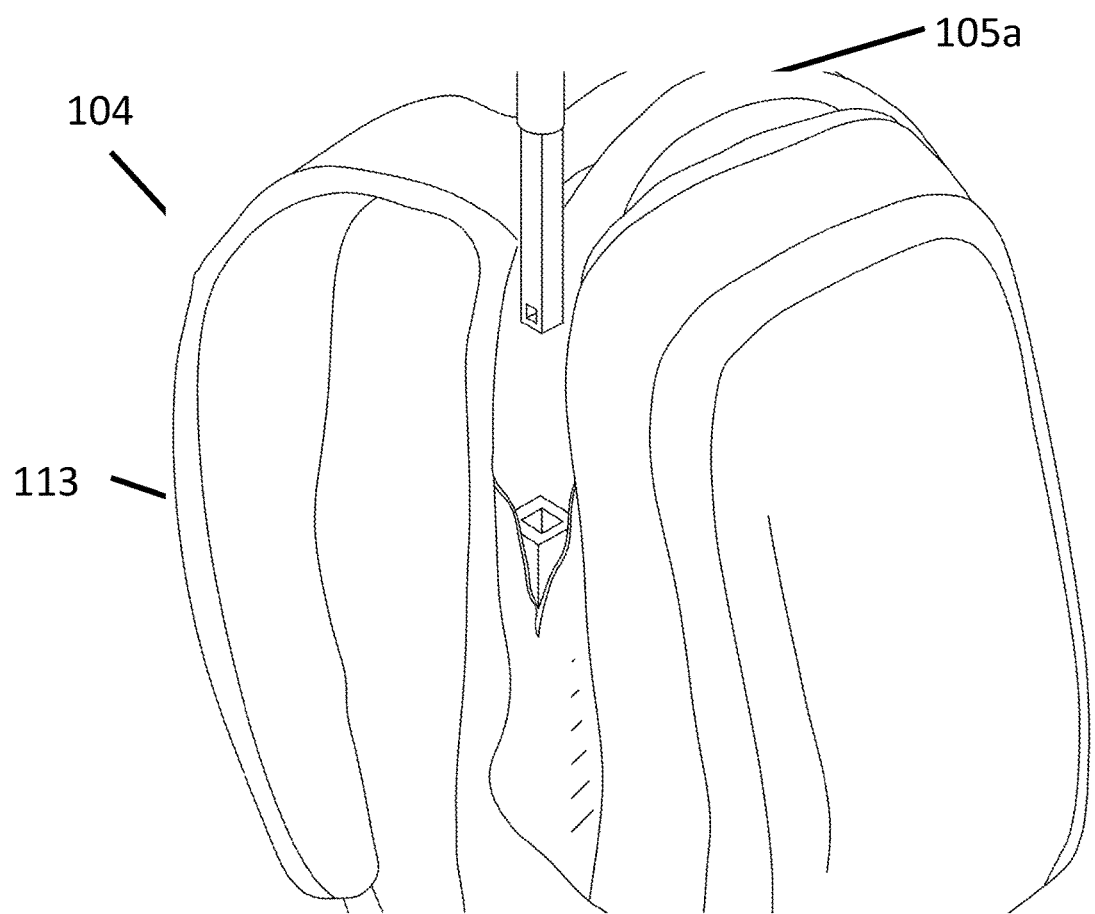
FIG. 3C is a schematic diagram of an embodiment of the stand including a latch for attaching the frame element to a baggage item.
Figure 3D:
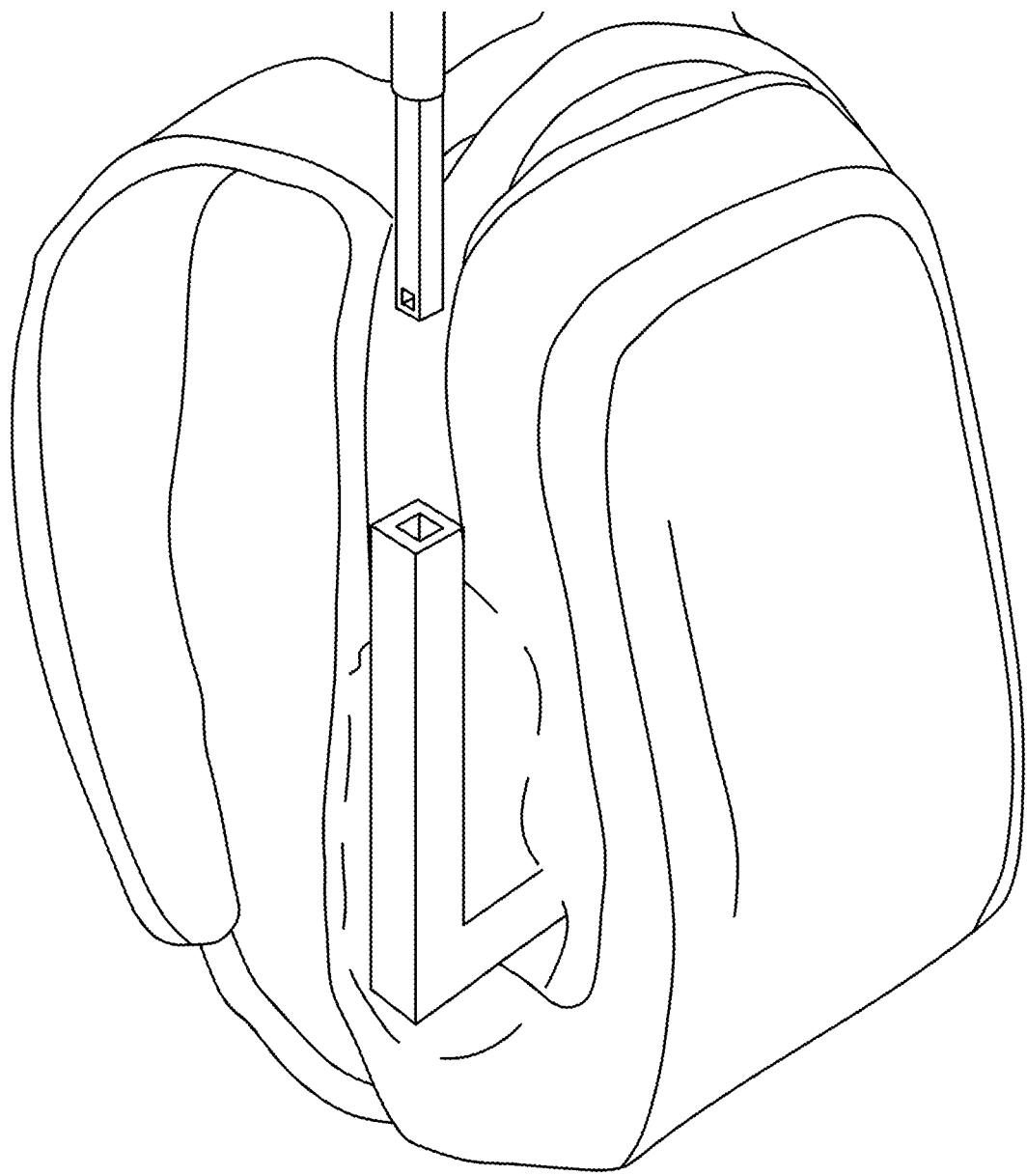
FIG. 3D is a schematic diagram of an embodiment of the stand including a latch for attaching the frame element to a baggage item.
Figure 3E:
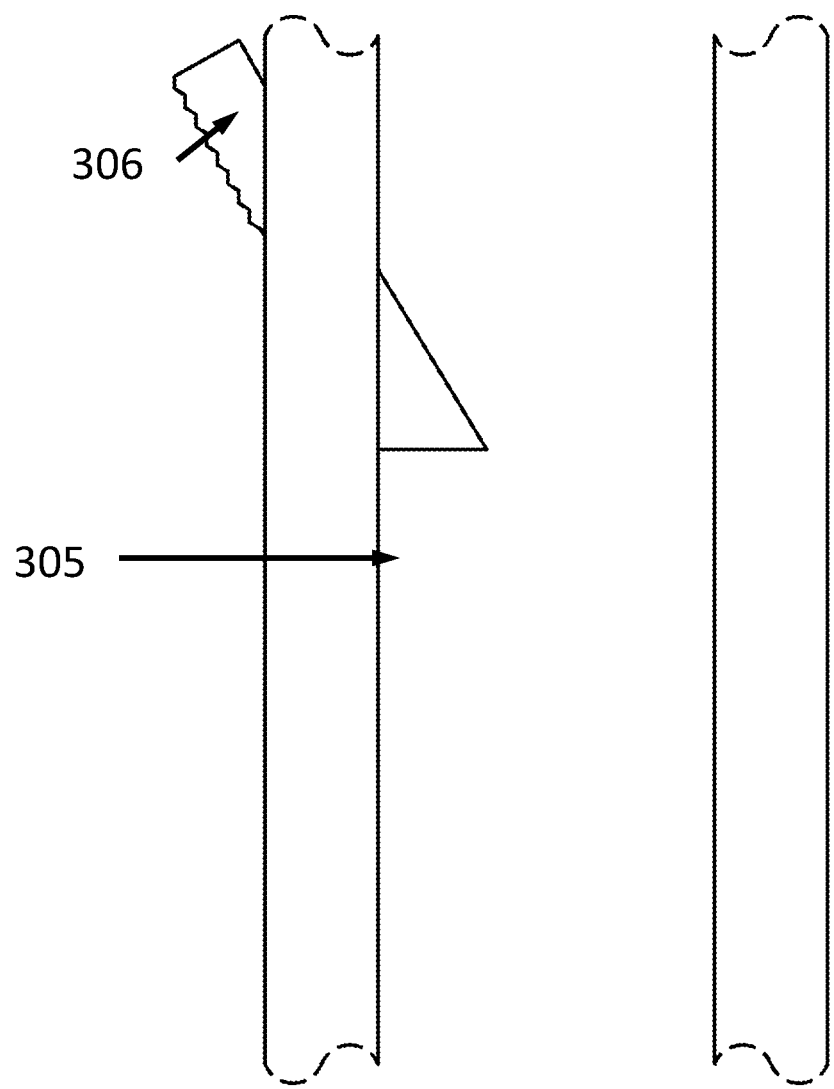
FIG. 3E is a schematic diagram of an embodiment of a latch.

Some embodiments of the stand 100 include a fastener, such as a latch 304, that detachably joins the proximal end of the shaft 101 to the baggage item 104. In some embodiments, the latch 304 is incorporated in the shaft 101, as shown for example in FIG. 3B. In other embodiments, the latch 304 is incorporated in the baggage item 104, as illustrated for example in FIGS. 3C-E. In some embodiments, the latch 304 is a fastener that detachably joins the shaft 101 to the baggage item 104. In some embodiments, the baggage item 104 includes a chamber 305 into which the proximal end of the shaft 101 slides; the latch 304 may affix the shaft 101 to the chamber 305 so that the shaft 101 cannot be removed from the chamber 305 without disengaging the latch 304. The latch 304 may have any form useful for preventing the shaft 101 from sliding with respect to the chamber, including the forms described above in reference to FIG. 2A-B. For instance, as described above, the latch 304 may be urged into a corresponding chamber in the shaft 101 or chamber 305 by a biasing means. The latch 304 may have a manual control 306 as illustrated for instance in FIG. 3E; the manual control 306 may include without limitation a lever, slide button, or pull tab. As illustrated for instance in FIG. 3D, the latch 304 may attach the shaft to the at least one frame element 301; for instance, the chamber 305 may be attached to the at least one frame element 301. In some embodiments, the latch 304 enables a user to disengage the shaft 101 from the baggage item 104 and use it independently as a "selfie stick" or similar apparatus. The fastener 304 may alternatively include straps, hook and loop fasteners, or other mechanisms for detachably attaching two items. The fastener 304 may attach the shaft 101 anywhere on the frame 301 or baggage item 104, including on the bottom or on any side of the baggage item 104.

Figure 3F:
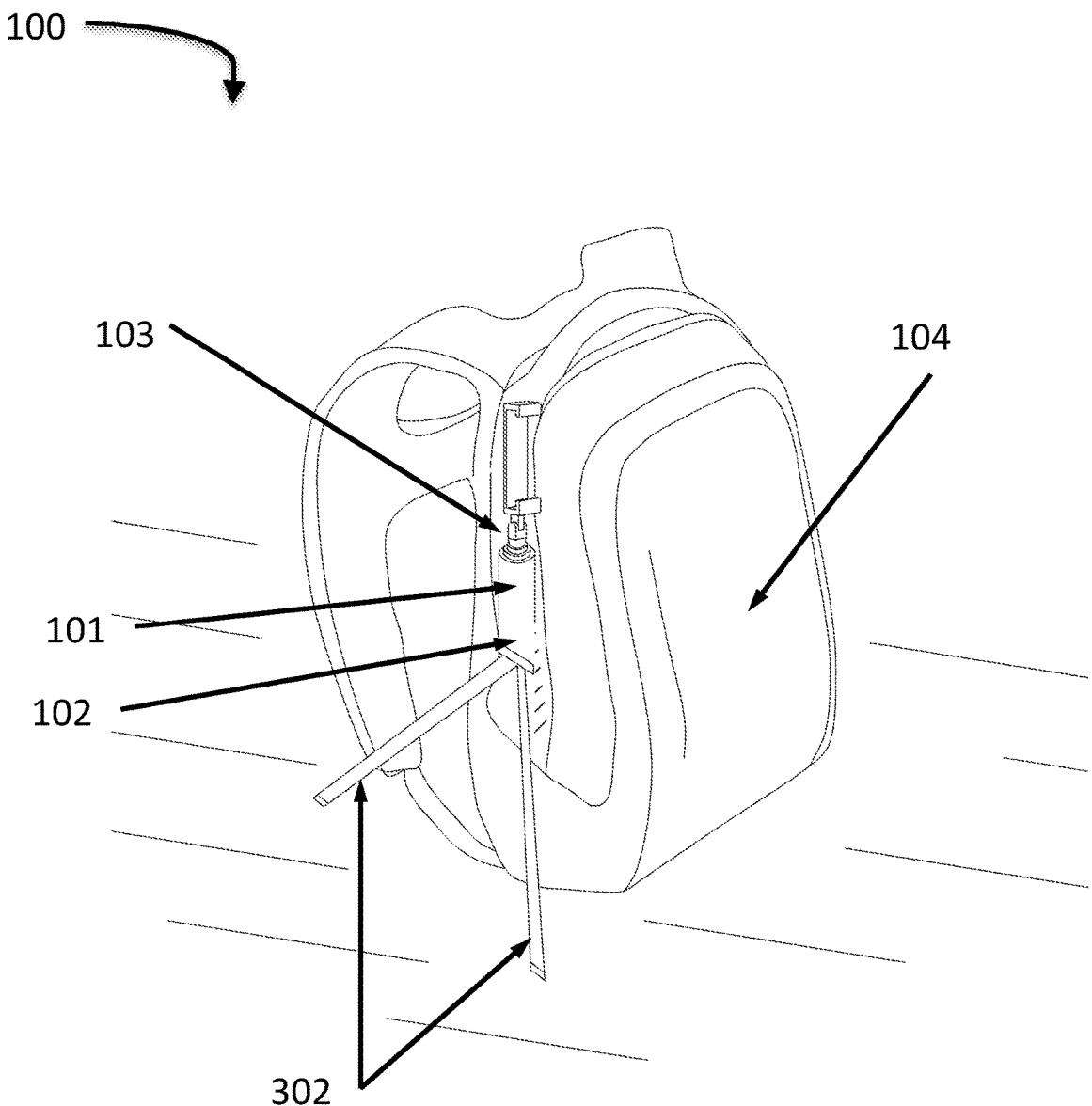
FIG. 3F is a schematic diagram of an embodiment of the stand including a brace.
Figure 3G:
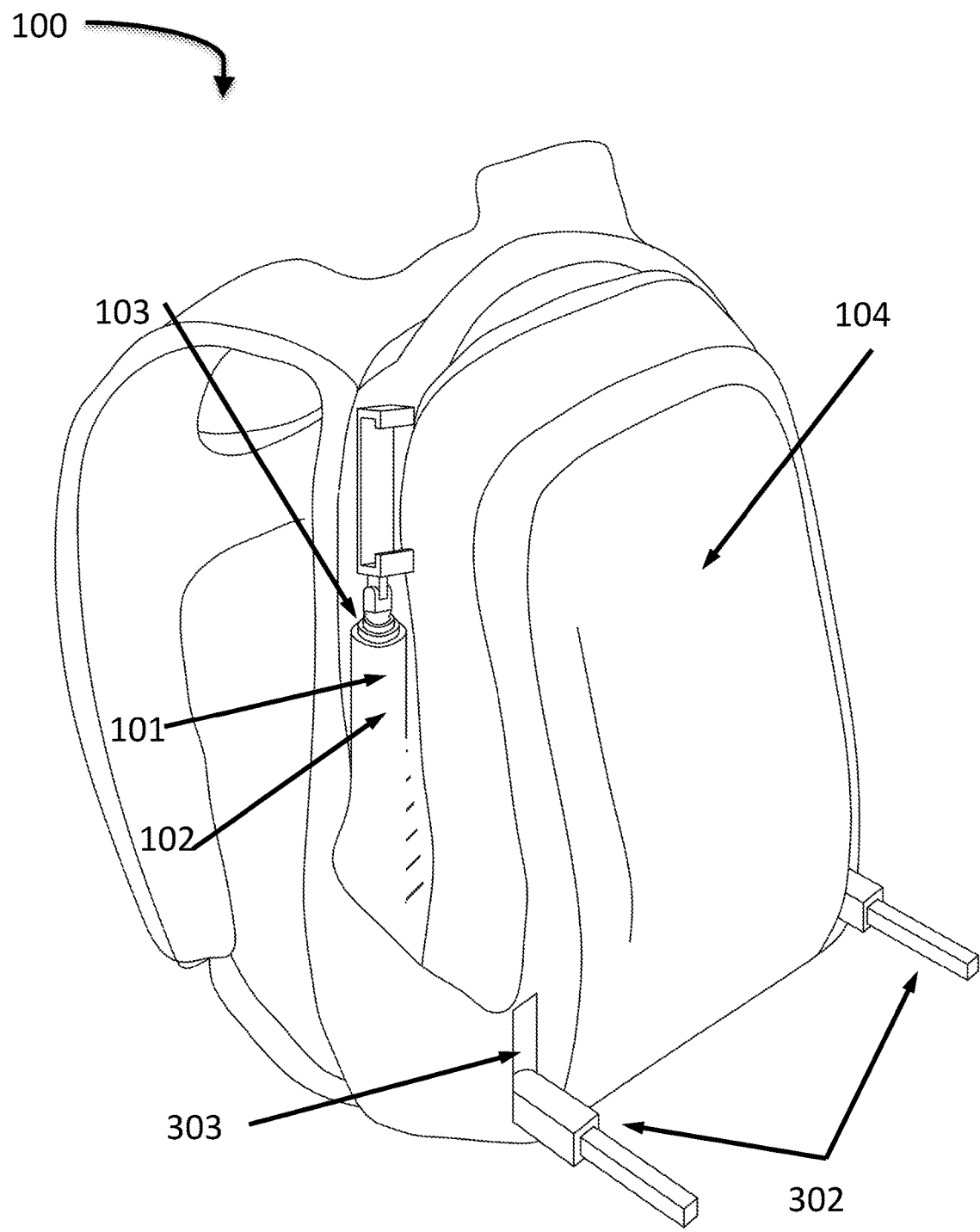
FIG. 3G is a schematic diagram of an embodiment of the stand including a brace.
Figure 3H:
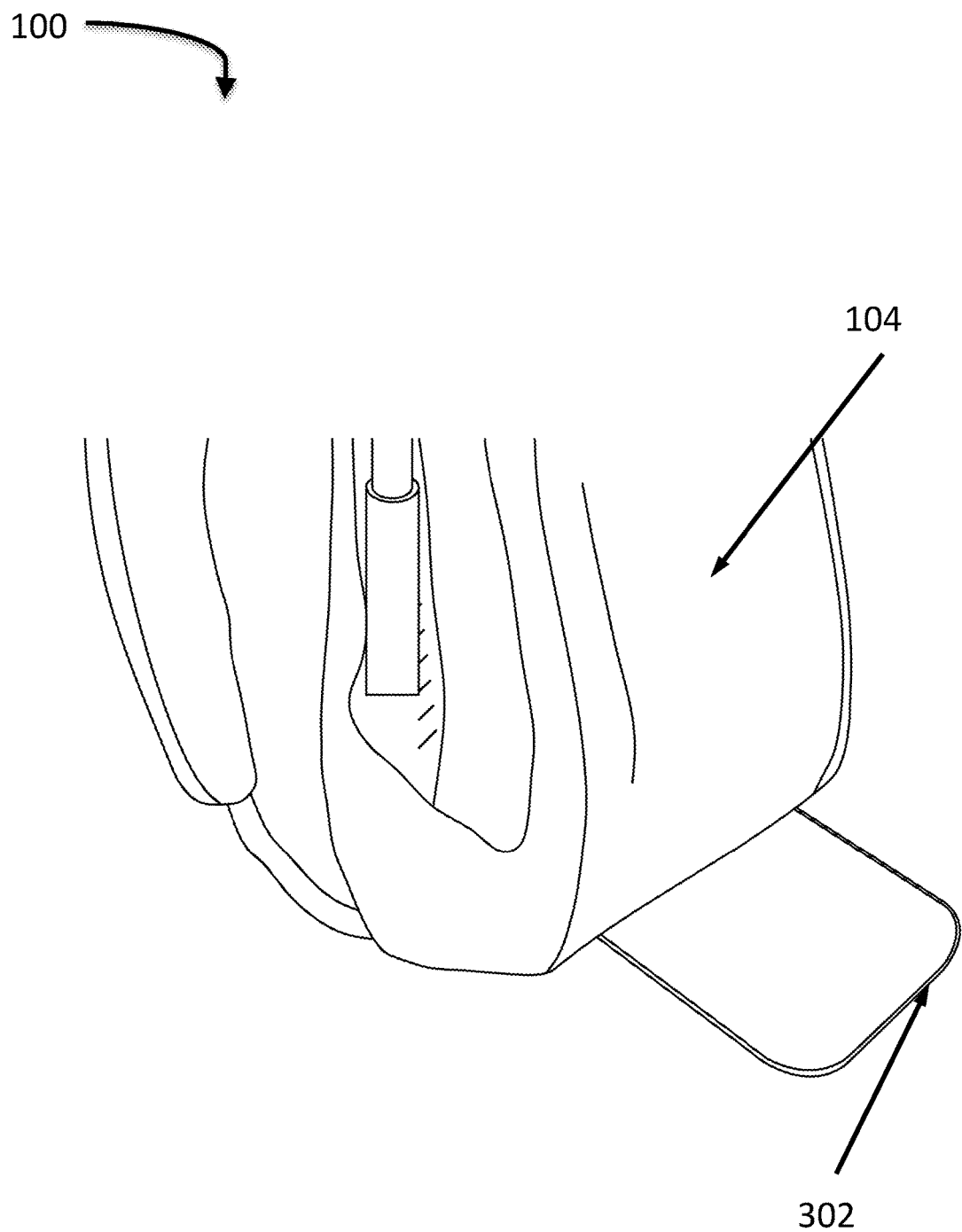
FIG. 3H is a schematic diagram of an embodiment of the stand including a brace.
Figure 3I:
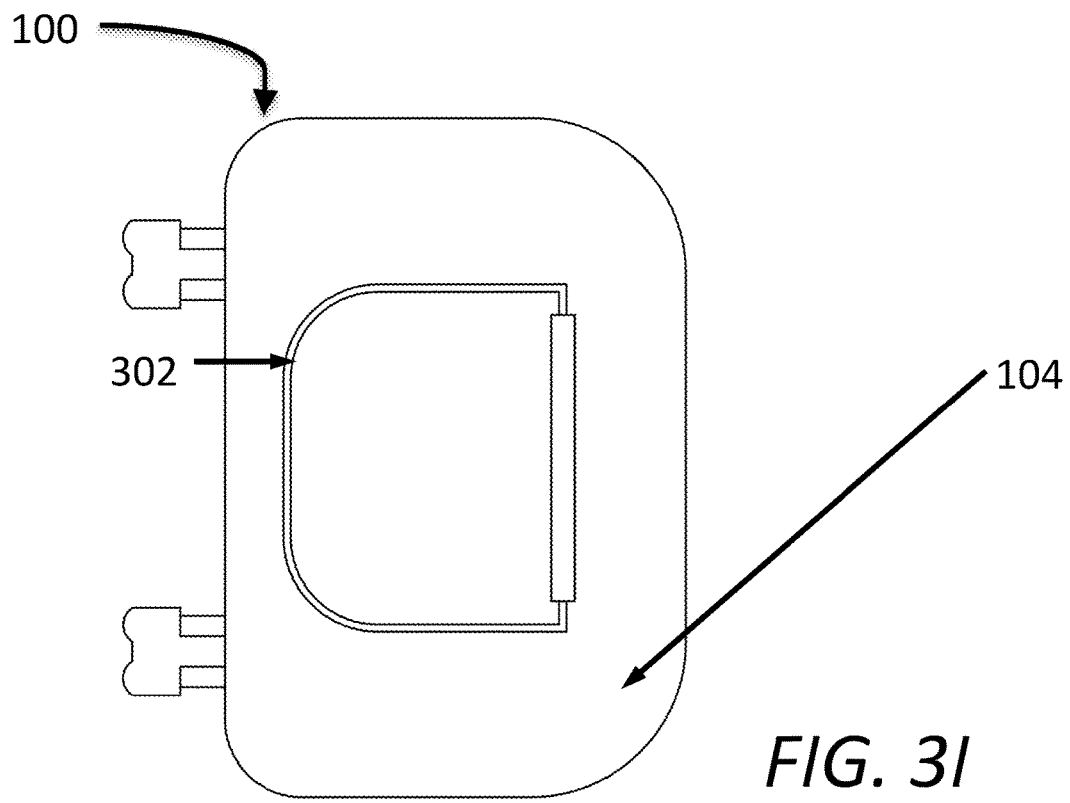
FIG. 3I is a schematic diagram of an embodiment of the stand including a brace.
Figure 3J:
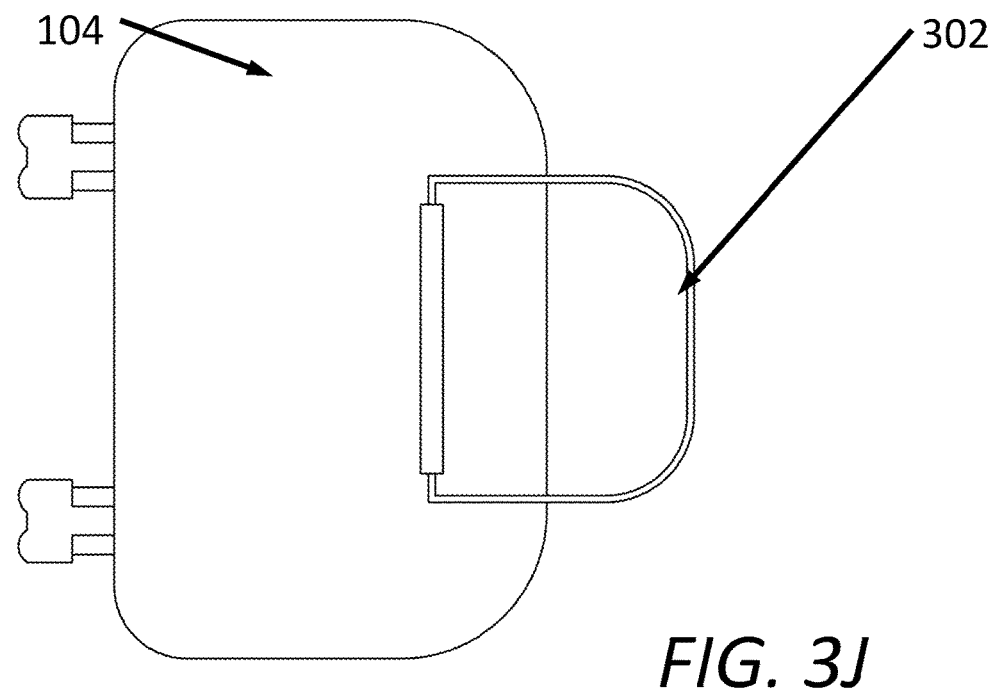
FIG. 3J is a schematic diagram of an embodiment of the stand including a brace.
Figure 3K:
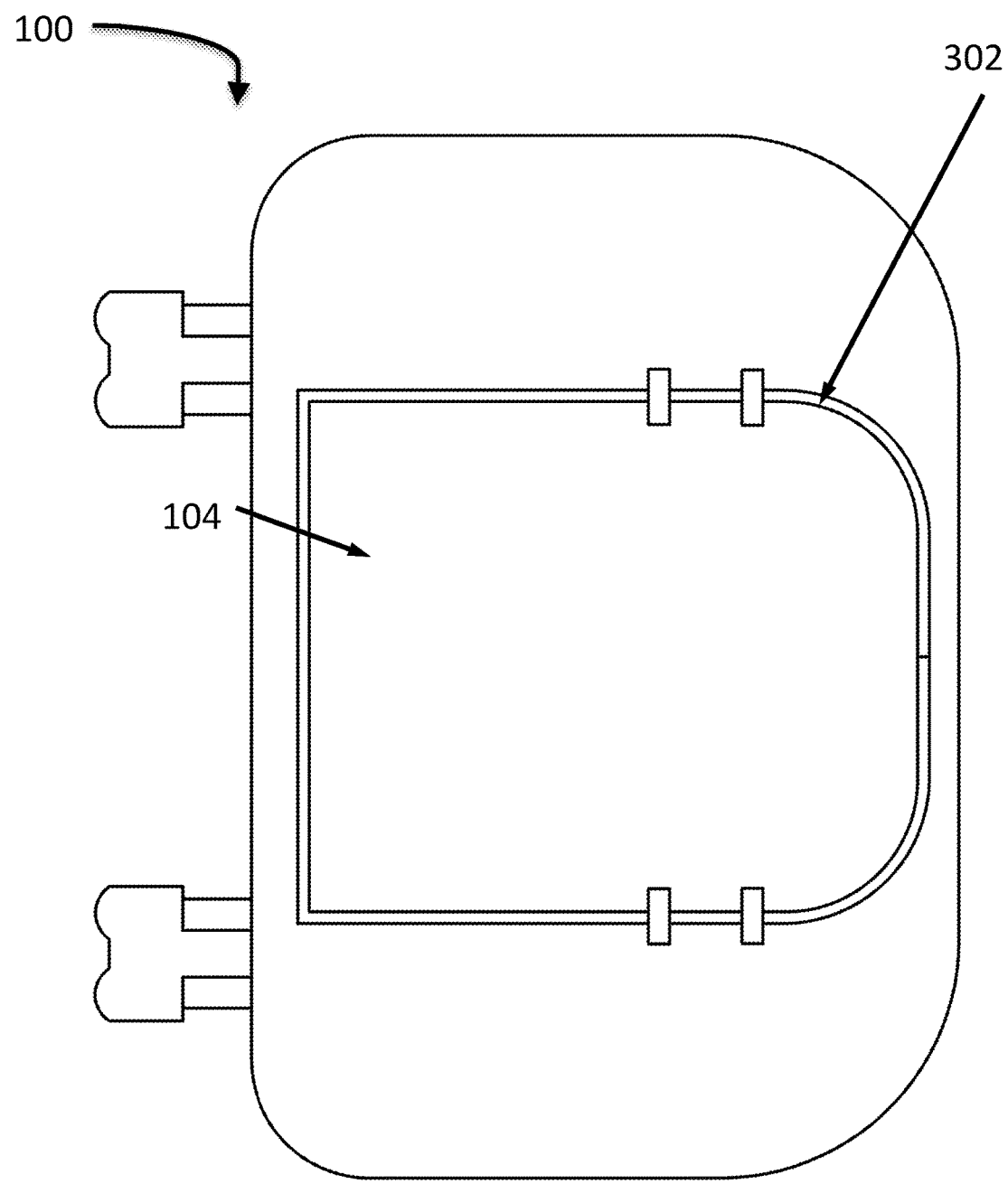
FIG. 3K is a schematic diagram of an embodiment of the stand including a brace.

As illustrated in FIG. 3F, the one or more basal elements may include a brace 302 that extends outward to contact the surface on which the stand 100 and baggage item 104 are resting. The brace 302 may be attached to the shaft 101, to the baggage item 104, or to both. The brace 302 may be constructed of any material or combination of materials suitable for constructing the shaft 101. The brace 302 may include one or more legs. The brace 302 may include one or more elements that engage the surface to hold the support 100 in position; for instance, the brace 302 may include one or more feet, which may have a high coefficient of static friction with respect to the surface on which the baggage item 104 and stand 100 are resting.

In some embodiments, the brace 302 may be moved between an extended position in which it is contacting the surface and a stowed position in which it is not contacting the surface; in the stowed position, elements of the brace 302 may be closer to the baggage item 104 or shaft, so that the brace 302 does not interfere with carrying the baggage item 104. For instance, one or more legs making up the brace 302 may be collapsible; this may be implemented in any way suitable for making the shaft 101 collapsible as described above in connection with FIGS. 1A-B. The legs may be folded against the shaft 101 or baggage item 104 when not in use. Some elements of the brace 302 may be detachable from the shaft 101, the baggage item 104, or the remainder of the brace 302. As an example, one or more legs may be detachable; for instance, a tab portion of each leg may be inserted in slots in the shaft 101 to attach the legs and put the brace 302 in a deployed position, and may be removed by pulling the tabs out of the slots.

In some embodiments, the stand 100 or the baggage item 104 includes a chamber 303 in which elements of the brace 302 may be stowed. The chamber may be any partially or fully enclosed chamber in which the brace elements can be inserted, including a pouch, a pocket, a groove, or a tube. For instance, a brace element such as a leg may fold into a groove in the shaft 101 or baggage item 194, or retract into a tube in the shaft 101 or baggage item 104. Alternatively, a detachable leg may be stowed in a pocket in the baggage item 104.

In other embodiments, as illustrated for instance in FIGS. 3H-K, the brace element 302 may be attached against the base of the baggage item 104. The brace element 302 may be stowed against the bottom of the baggage item 104 when not in use. In some embodiments, the brace element 302 is pivotally attached to the bottom of the baggage item 104 so that it may be swung outward to a deployed position as in FIG. 3J, or swung inward into a stowed position as in FIG. 3I; a fastener (not shown) may secure the brace element 302 in the stowed position. In other embodiments, as shown for instance in FIG. 3K, the brace element 302 is slidably attached to the bottom of the baggage item 104, and is slidable between an extended position and a retracted position.

Figure 4:
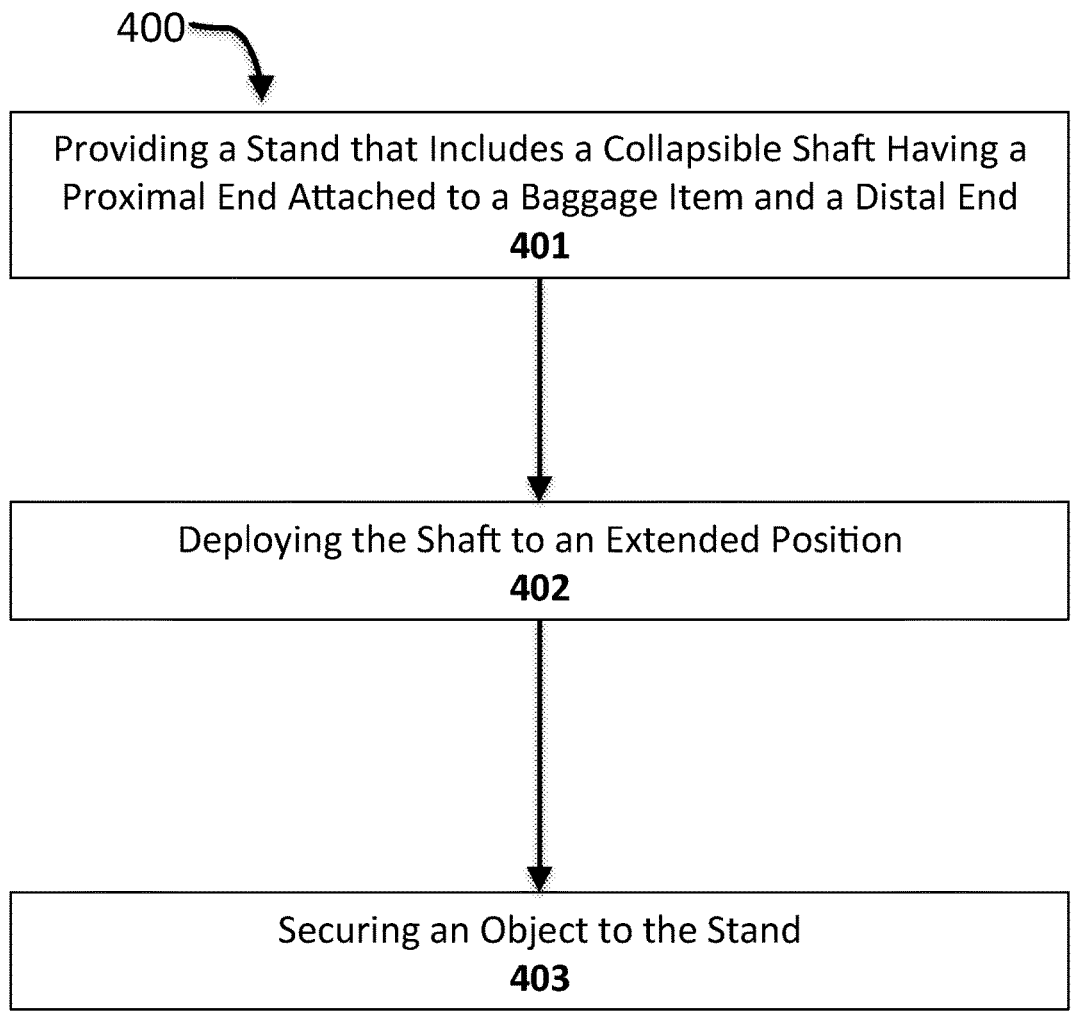
FIG. 4 is a flow diagram illustrating one embodiment of the disclosed method.

FIG. 4 illustrates some embodiments of a method 400 for using a stand. The method 400 includes providing a stand that includes a collapsible shaft having a proximal end attached to a baggage item and a distal end (401); the stand 100 may be as described above in reference to FIGS. 1A-3F. The method 400 involves deploying the shaft to an extended position (402); this may be implemented as described above in reference to FIGS. 1A-3F. The method 400 involves securing an object to the stand 100 (403); this may be implemented as described above in reference to FIGS. 1A-3F.

Although the foregoing systems and methods have been described in some detail for purposes of clarity of understanding, it will be apparent that certain changes and modifications may be practiced within the scope of the appended claims.

What is claimed is:

1. A stand attached to a baggage item, the stand comprising:
   a collapsible shaft comprising a proximal end attached to the baggage item and a distal end;
   a support attached to the distal end, wherein the support further comprises a device to secure an object to the support;
   at least one basal element attached to said shaft; and a latch that detachably attaches the proximal end of the shaft to the baggage item.

2. The stand of claim 1, wherein the shaft further comprises a plurality of telescoping stages.

3. The stand of claim 2, wherein one stage of the plurality of telescoping stages is attached to the baggage item.

4. The stand of claim 1, wherein the shaft further comprises two or more stages that can pivot relative to each other to collapse the shaft.

5. The stand of claim 1, wherein the baggage item further comprises a chamber that admits the stand when the shaft is collapsed.

6. The stand of claim 1, wherein the shaft further comprises a plurality of mutually movable sections, and further comprising at least one latch that engages to fix a first section of the plurality of mutually movable sections with respect to a second section of the plurality of mutually movable sections.

7. The stand of claim 1, wherein the support is pivotally attached to the distal end of the shaft.

8. The stand of claim 1, wherein the device further comprises at least one strap.

9. The stand of claim 1, wherein the device further comprises at least one fastener.

10. The stand of claim 1, wherein the support further comprises a work surface.

11. The stand of claim 1, wherein the at least one basal element includes at least one frame element incorporated in the baggage item.

12. The stand of claim 1 wherein the at least one basal element further comprises a brace that extends outward to contact a surface on which the stand and baggage item are resting.

13. The stand of claim 12, wherein the brace is attached to the shaft.

14. The stand of claim 12, wherein the brace is attached to the baggage item.

15. The stand of claim 12, wherein the brace is movable between an extended position in which it is contacting the surface and a stowed position in which it is not contacting the surface.

16. The stand of claim 15, wherein the brace further comprises at least one collapsible leg.

17. The stand of claim 12 further comprising a chamber in which the brace is stowed when not in use.

* * * * *